(12) United States Patent
Shiraiwa

(10) Patent No.: US 6,979,153 B1
(45) Date of Patent: Dec. 27, 2005

(54) DEEP-GROOVING INSERT HAVING STEPPED CUTTING EDGE

(75) Inventor: Akio Shiraiwa, Waldwick, NJ (US)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/921,840

(22) Filed: Aug. 20, 2004

(51) Int. Cl.[7] .............................................. B23B 27/16
(52) U.S. Cl. ........................ 407/107; 407/114; 407/116
(58) Field of Search .............................. 407/102, 107, 407/111, 113, 117, 114, 60, 116; 83/883–855; B23B 27/16

(56) References Cited

U.S. PATENT DOCUMENTS

| | | | |
|---|---|---|---|
| 5,704,737 A | | 1/1998 | Alford |
| 5,807,031 A | * | 9/1998 | Arai et al. .................. 407/113 |
| 5,975,812 A | | 11/1999 | Friedman |
| 6,799,925 B2 | * | 10/2004 | Ejderklint ................... 407/116 |

FOREIGN PATENT DOCUMENTS

JP        60135104 A  *  7/1985  ........... B23B 27/22

* cited by examiner

Primary Examiner—Boyer D. Ashley
Assistant Examiner—Sara Addisu
(74) Attorney, Agent, or Firm—Drinker Biddle & Reath LLP

(57) ABSTRACT

A deep-grooving chip-forming cutting insert includes a rear mounting portion, a front cutting portion, and a pair of side walls, each side wall extending along the front and rear portions. The front cutting portion includes a front end surface, a top surface, and a cutting edge disposed at a transition between the front end surface and the top surface and extending from one side wall to the other to define a cutting width. The cutting edge includes a main portion, a pair of convexly curved first corner portions disposed at respective ends of the main portion, and a pair of convexly curved second corner portions offset rearwardly and outwardly with respect to respective first corner portions, wherein a step is formed between each first corner portion and its respective second corner portion. The main portion has a length as viewed in a direction perpendicular to the top surface, and which is at least 80% of the cutting width.

8 Claims, 3 Drawing Sheets

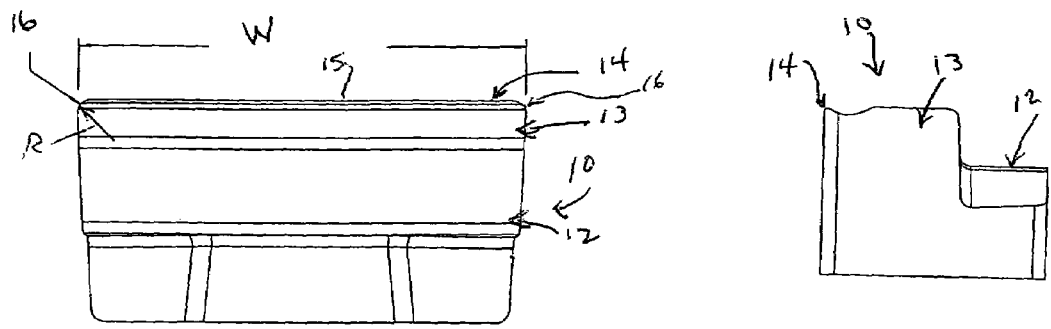
FIG. 1
(PRIOR ART)
FIG. 2
(PRIOR ART)
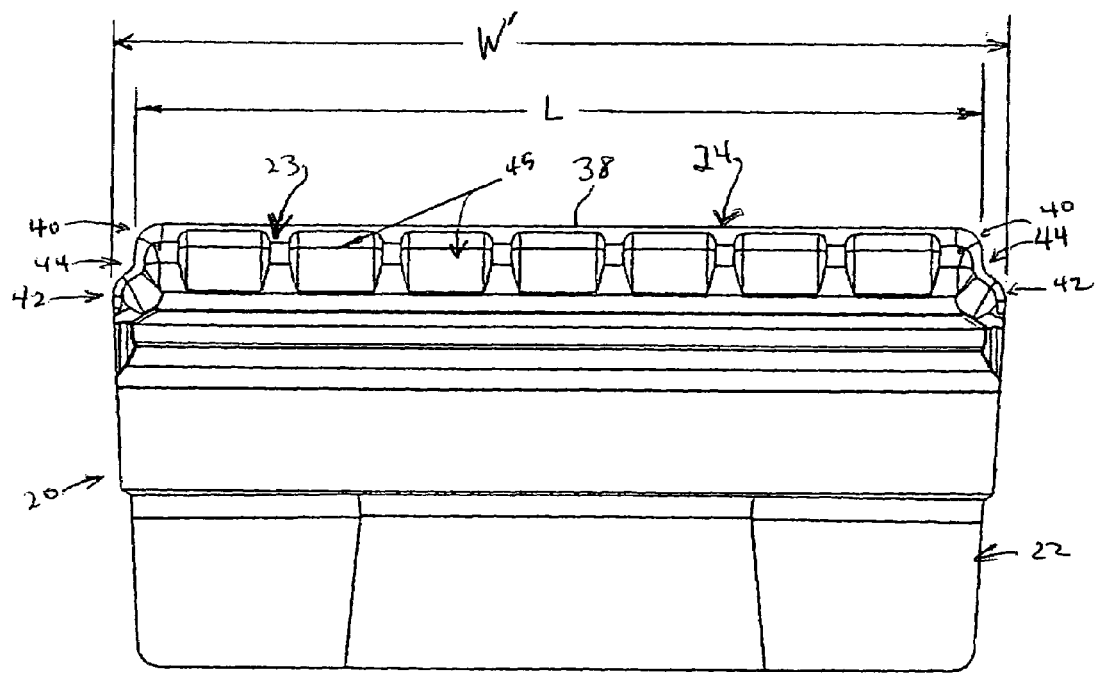
FIG. 3

DEEP-GROOVING INSERT HAVING STEPPED CUTTING EDGE

BACKGROUND OF THE INVENTION

The present invention relates to a deep-grooving chip-forming cutting insert.

A conventional deep-grooving cutting insert 10 for chip forming machining is depicted in FIGS. 1 and 2. That insert 10 includes a rear mounting portion 12 adapted to be secured in a holder, and a front cutting portion 13 including a cutting edge 14. The cutting edge, which extends perpendicularly to the direction of feed, is adapted to cut a groove having a width W.

The cutting edge includes a main portion 15 and a pair of corner portions 16 disposed at opposite ends of the main portion and defining the ends of the cutting edge. The corner portions are convexly curved, e.g., they define a corner radius R.

During a grooving operation, the cutting edge 14 produces a single chip which extends along the main portion 15 and the corner portions 16. Thus, it will be appreciated that the ends of the chip are slightly curved, so the overall total chip width is somewhat greater than the cutting width W of the cutting edge, which cutting width W corresponds to the width of a groove being cut. As the wide chip is pushed out of the groove, it rubs against the sides of the groove, whereby producing friction which generates heat that causes a hardening and deterioration of those groove sides. Also, it becomes increasingly more difficult to push the chips out of the groove as the groove becomes deeper, which adversely affects the condition of the cutting edge and thus, the tool life.

A grooving insert is disclosed in U.S. Pat. No. 5,975,812 wherein the main portion of the cutting edge is divided into three equal-length portions, the center portion of which is offset forwardly from the other two portions. The cutting edge portions cut respective chips of essentially equal width which interfere with one another as they leave the groove. Such a condition may develop vibrations in deep-groove cutting operations which adversely affect the ability to control the chips produced, and may lead to chip jam-ups and entanglements.

It would be desirable to provide a deep-grooving insert that minimizes the generation of frictional heat during a grooving operation.

It would also be desirable to provide a deep-grooving insert which is easier to control and avoids chip jam-ups and entanglements.

SUMMARY OF THE INVENTION

The objects of the invention are achieved by a deep-grooving chip-forming cutting insert which comprises a rear mounting portion, a front cutting portion, and a pair of sidewalls. Each sidewall extends along the front and rear portions. The front cutting portion includes a front end surface, a top surface, and a cutting edge disposed at a transition between the front end surface and the top surface and extending from one sidewall to the other to define a cutting width. The cutting edge comprises a main portion, a pair of convexly curved first corner portions disposed at respective ends of the main portion, and a pair of convexly curved second corner portions disposed rearwardly and outwardly with respect to the respective first corner portions. Thus, a step is formed between each first corner portion and its respective second corner portion. The main portion has a length as viewed in a direction perpendicular to the top surface. That length is at least 80% of the cutting width, more preferably at least 90%, and most preferably at least 95%.

BRIEF DESCRIPTION OF THE DRAWING

The objects and advantages of the invention will become apparent from the following detailed description of a preferred embodiment thereof in connection with the accompanying drawings.

FIG. 1 is a top elevational view of a prior art deep-grooving cutting insert.

FIG. 2 is a side elevational view of the prior art insert of FIG. 1.

FIG. 3 is a top plan view of a deep-grooving insert according to the present invention.

DESCRIPTION OF A PREFERRED EMBODIMENT OF THE INVENTION

Figure 4:
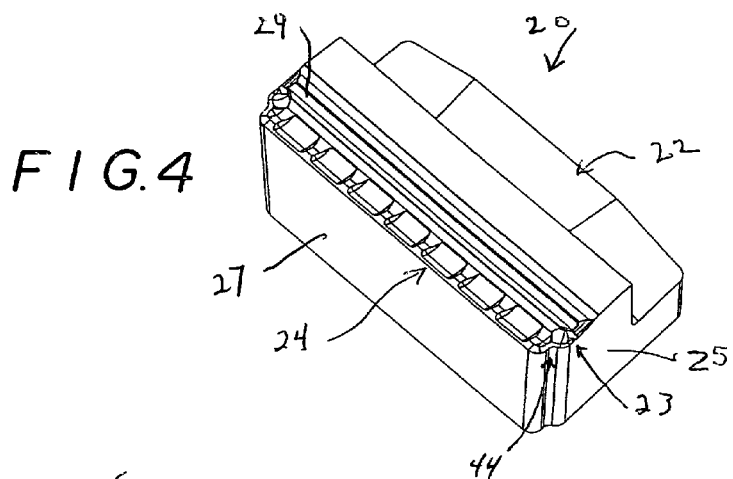
FIG. 4 is a top front perspective view of the insert of FIG. 3.
Figure 5:
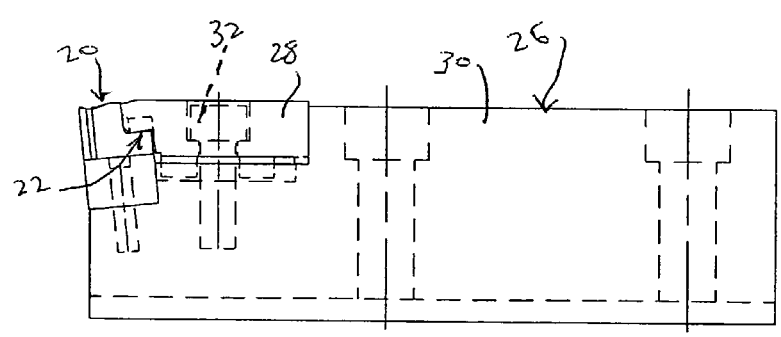
FIG. 5 is a side elevational view of the cutting insert of FIG. 3 mounted in a holder.
Figure 6:
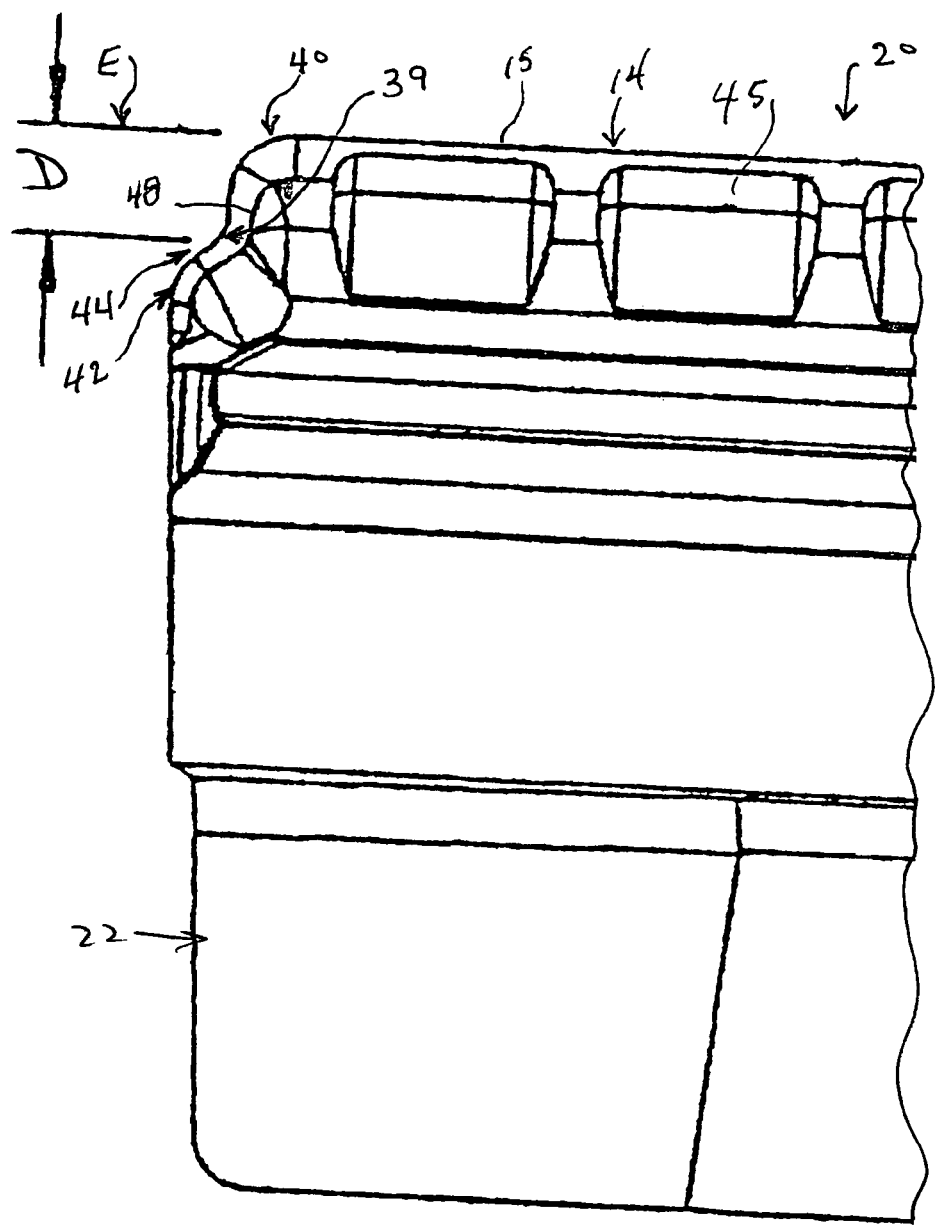
FIG. 6 is an enlarged fragmentary view of FIG. 3.

Depicted in FIGS. 3–6 is a deep-grooving cutting insert 20 according to the invention. The insert 20 comprises a rear mounting portion 22 adapted to be secured in a holder 26 (FIG. 5), and a front cutting portion 23. A pair of opposite side walls 25 extend along the front and rear portions 22, 24. The holder 26, depicted in FIG. 5, is conventional and includes a clamp 28 secured in a holder body 30 by a screw 32 for pressing against the mounting portion 22.

The front cutting portion includes a front end surface 27 and a top surface 29, which function as clearance surfaces. A cutting edge 24 is disposed at a transition between the top surface and the front end surface. The cutting edge 24 includes a main portion 38 a pair of first corner portions 40 disposed at respective ends of the main portion, and a pair of second corner portions 42 which are offset rearwardly and outwardly with respect to the first corner portions 40, whereby a step 44 is formed between each first corner portion 40 and its associated second corner portion 42. The main portion 38 is preferably linear when the insert is viewed from the top (FIG. 3) and from the front (i.e., from left to right in FIG. 5), although the cutting edge could be slightly curved when viewed in one or both of those directions.

The insert could be provided with a plurality of recesses 45 spaced apart along the main and corner portions, and disposed slightly inwardly thereof for promoting chip breakage, in a known manner. Other forms of chip breaking structures could be alternatively provided if desired.

Each step 44 includes a step section 48 extending rearwardly from a respective first corner portion 40 in a direction perpendicular to the main portion 38 to a transition 39 with the second corner portion 42.

A substantial portion of the cutting width W' is occupied by the main cutting edge, e.g. at least 80% main portion 38. That is, the length L of the main portion as viewed in direction perpendicular to the top surface 29 is at least 80% of the cutting width W', more preferably at least 90%, and most preferably at least 95%.

Each step 44 has a depth D extending rearwardly from an extension E of the main portion 38 to the transition 39 between the step section 48 and the second corner portion 42. The depth D is preferably no greater than 10% of the cutting width W', more preferably no greater than 7%, and most preferably no greater than 5%.

The insert is preferably formed of cemented carbide, such as tungsten carbide, although it could be formed of other materials, if desired.

During a groove cutting operation, at least three chips will be formed, i.e., a wide chip will be cut by the main cutting edge, and narrow chips will be cut by respective steps 44. The length of the wide chip will be less than the groove width W' for smooth evacuation. The narrow chips are so narrow that they can be easily evacuated from the groove without producing appreciable rubbing action against the sides of the groove. Also, the narrow chips are too weak to appreciably hinder the evacuation of the wide chip.

Thus, the deterioration of the groove sides that is produced by the friction generated by prior art inserts during deep grooving operations should be minimized. Also, it will be easier to push the chips out of the groove, so the life of the cutting edge will be extended. Fewer vibrations are generated by the insert, so it is easier to control and less likely to cause chip jam-ups and entanglement.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A deep-grooving chip-forming cutting insert comprising a rear mounting portion, a front cutting portion, and a pair of side walls; each side wall extending along the front and rear portions; the front cutting portion including a front end surface, a top surface, and a cutting edge disposed at a transition between the front end surface and the top surface and extending from one side wall to the other to define a cutting width; the cutting edge comprising a main portion, a pair of convexly curved first corner portions disposed at respective ends of the main portion, and a pair of convexly curved second corner portions offset rearwardly and outwardly with respect to respective first corner portions, wherein a step is formed between each first corner portion and its respective second corner portion; the main portion having a length as viewed in a direction perpendicular to the top surface, and which is at least 80% of the cutting width.

2. The cutting insert according to claim 1 wherein the length of the main portion is at least 90% of the cutting width.

3. The cutting insert according to claim 1, wherein the length of the main portion is at least 95% of the cutting width.

4. The cutting insert according to claim 1 wherein each step includes a step section extending from the first corner portion in a direction substantially perpendicularly to the main portion.

5. The cutting insert according to claim 1 wherein each step includes a depth measured from an extension of the main portion to a transition between the step section and the respective second corner portion, the depth being no greater than 10% of the cutting width.

6. The cutting insert according to claim 5 wherein the depth is no greater than 7% of the cutting width.

7. The cutting insert according to claim 5 wherein the depth is no greater than 5% of the cutting width.

8. A deep-grooving chip-forming cutting insert comprising a rear mounting portion, a front cutting portion, and a pair of side walls; each side wall extending along the front and rear portions; the front cutting portion including a front end surface, a top surface, and a cutting edge disposed at a transition between the front end surface and the top surface and extending from one side wall to the other to define a cutting width; the cutting edge comprising a main portion, a pair of convexly curved first corner portions disposed at respective ends of the main portion, and a pair of convexly curved second corner portions offset rearwardly and outwardly with respect to respective first corner portions, wherein a step is formed between each first corner portion and its respective second corner portion; the main portion having a length as viewed in a direction perpendicular to the top surface, and which is at least 90% of the cutting width, wherein each step includes a step section extending from the first corner portion in a direction substantially perpendicularly to the main portion to define a depth of the step, the depth measured from an extension of the main portion to a transition between the step section and the respective second corner portion, the depth being no greater than 7% of the cutting width.

* * * * *